(12) United States Patent
Dilalan et al.

(10) Patent No.: US 9,896,993 B2
(45) Date of Patent: Feb. 20, 2018

(54) DEVICE FOR ACTUATING THE WASTEGATE FLAP OF AN EXHAUST GAS TURBOCHARGER

(71) Applicant: CONTINENTAL AUTOMOTIVE GMBH, Hannover (DE)

(72) Inventors: Uemit Dilalan, Mannheim (DE); Bruno Ferling, Beindersheim (DE)

(73) Assignee: Continental Automotive GmbH, Hannover (DE)

( * ) Notice: Subject to any disclaimer, the term of this patent is extended or adjusted under 35 U.S.C. 154(b) by 163 days.

(21) Appl. No.: 14/904,187

(22) PCT Filed: Jun. 26, 2014

(86) PCT No.: PCT/EP2014/063604
§ 371 (c)(1),
(2) Date: Jan. 11, 2016

(87) PCT Pub. No.: WO2015/003921
PCT Pub. Date: Jan. 15, 2015

(65) Prior Publication Data
US 2016/0146098 A1 May 26, 2016

(30) Foreign Application Priority Data

Jul. 11, 2013 (DE) .................. 10 2013 213 558

(51) Int. Cl.
*F16K 31/44* (2006.01)
*F02B 37/18* (2006.01)
(Continued)

(52) U.S. Cl.
CPC .......... *F02B 37/186* (2013.01); *F16C 11/069* (2013.01); *F16C 11/08* (2013.01);
(Continued)

(58) Field of Classification Search
CPC ..... F16C 11/06; F16C 11/069; F16C 11/0619; F16C 11/0652; F16C 11/0695; F16C 11/08; F16C 11/086; Y10T 74/18968; F04B 53/145; F16H 21/44; F16K 31/485; F16K 31/521; F16K 31/1635; F02B 37/186
(Continued)

(56) References Cited

U.S. PATENT DOCUMENTS 2,491,380 A 12/1949 Kutzler
2,621,472 A 12/1952 Udale
(Continued)

FOREIGN PATENT DOCUMENTS

CN 1204334 C 6/2005
CN 102713384 A 10/2012
(Continued)

*Primary Examiner* — Matthew W Jellett
(74) *Attorney, Agent, or Firm* — Laurence A. Greenberg; Werner H. Stemer; Ralph E. Locher

(57) ABSTRACT

A device actuates a waste gate flap of an exhaust gas turbocharger of an internal combustion engine. The device has an actuator which has an actuator rod, a lever which is connected to the actuator rod and a spindle which is connected to the lever and to which the waste gate flap is secured. A resiliently mounted ball head rod is provided between the actuator rod and the lever.

12 Claims, 3 Drawing Sheets

(51) Int. Cl.
  *F16C 11/08* (2006.01)
  *F16C 11/06* (2006.01)
  *F16K 31/163* (2006.01)
  *F16K 31/52* (2006.01)
  *F01D 17/10* (2006.01)

(52) U.S. Cl.
  CPC .......... *F16K 31/1635* (2013.01); *F16K 31/44* (2013.01); *F16K 31/521* (2013.01); *F01D 17/105* (2013.01); *F16C 11/086* (2013.01); *Y02T 10/144* (2013.01)

(58) Field of Classification Search
  USPC ............... 251/228, 233, 236, 243, 300, 301; 74/108; 403/132, 138, 144, 146, 165
  See application file for complete search history.

(56) References Cited

U.S. PATENT DOCUMENTS

| | | | | |
|---|---|---|---|---|
| 3,854,557 | A * | 12/1974 | Wilcox | F16F 9/3415 137/539 |
| 4,557,111 | A | 12/1985 | Haussmann et al. | |
| 5,642,956 | A * | 7/1997 | Hale | F16F 15/08 403/122 |
| 5,704,726 | A * | 1/1998 | Nemoto | B62D 7/16 403/132 |
| 5,816,731 | A * | 10/1998 | Howard | B62D 7/16 403/120 |
| 6,273,631 | B1 * | 8/2001 | Takahashi | F16C 7/06 403/104 |
| 6,413,126 | B1 * | 7/2002 | Johnson | B63H 11/113 114/144 R |
| 6,676,325 | B2 * | 1/2004 | Schmidt | B62D 7/16 403/120 |
| 6,773,197 | B2 * | 8/2004 | Urbach | B60G 7/005 403/135 |
| 7,644,500 | B2 * | 1/2010 | Schmidt | B23P 11/005 29/441.1 |
| 7,677,040 | B2 | 3/2010 | McEwan | |
| 9,038,381 | B2 | 5/2015 | Ehrmann et al. | |
| 9,109,713 | B2 | 8/2015 | Weber | |
| 9,194,165 | B2 * | 11/2015 | Kang | F16C 11/0652 |
| 2005/0050888 | A1 | 3/2005 | McEwan | |
| 2012/0036950 | A1 | 2/2012 | Klipfel et al. | |
| 2012/0304951 | A1 | 12/2012 | Weber | |
| 2015/0000127 | A1 | 1/2015 | Werstat et al. | |
| 2015/0167542 | A1 | 6/2015 | Reinisch | |
| 2015/0273966 | A1 * | 10/2015 | Nilsson | F16C 11/0628 403/132 |

FOREIGN PATENT DOCUMENTS

| | | |
|---|---|---|
| CN | 102788081 A | 11/2012 |
| DE | 1995783 U | 10/1968 |
| DE | 3212498 A1 | 10/1983 |
| DE | 102007018618 A1 | 10/2007 |
| DE | 102009051623 A1 | 5/2011 |
| DE | 102009057161 A1 | 6/2011 |
| DE | 102010031500 A1 | 1/2012 |
| DE | 202011108775 U1 | 5/2012 |
| DE | 202007019447 U1 | 10/2012 |
| DE | 102013202191 A1 | 8/2014 |
| EP | 0976919 B1 | 2/2004 |
| EP | 2418366 A1 | 2/2012 |
| FR | 2823795 A1 | 10/2002 |
| WO | 2011026471 A1 | 3/2011 |
| WO | 2011061095 A2 | 5/2011 |
| WO | 2014005940 A1 | 1/2014 |
| WO | 2014005941 A1 | 1/2014 |

* cited by examiner

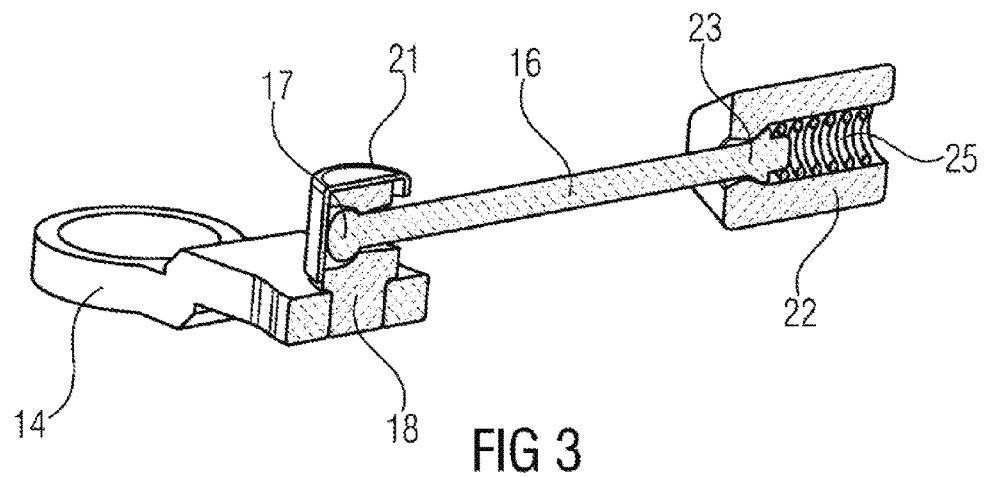
FIG 3
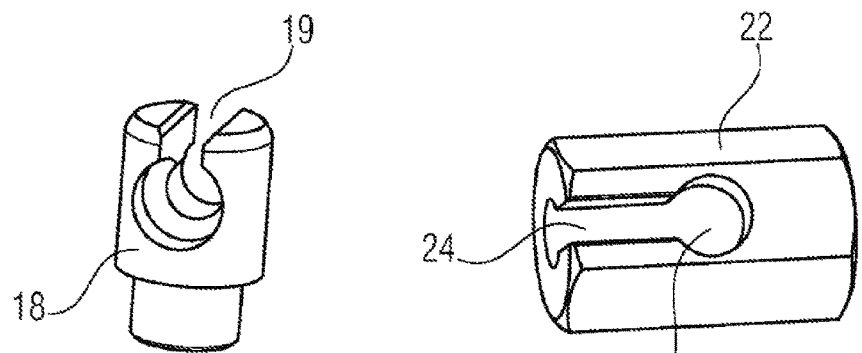
FIG 4
FIG 5
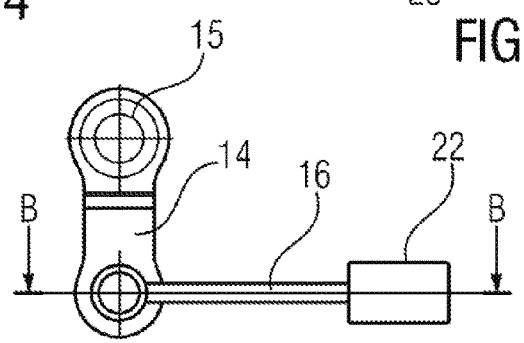
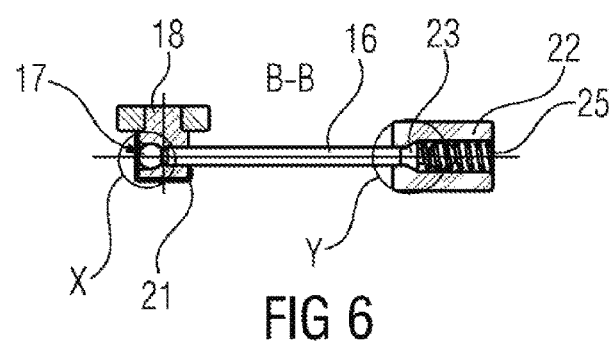
FIG 6

DEVICE FOR ACTUATING THE WASTEGATE FLAP OF AN EXHAUST GAS TURBOCHARGER

BACKGROUND OF THE INVENTION

Field of the Invention

The invention relates to a device for actuating the wastegate flap of an exhaust gap turbocharger.

An exhaust gas turbocharger serves to increase the performance and efficiency of piston engines. It has a turbine wheel arranged in a turbine housing, and a compressor impeller arranged in a compressor housing. The turbine wheel and the compressor impeller are arranged on a common shaft which is mounted in a bearing housing arranged between the turbine housing and the compressor housing. The turbine wheel is driven by the exhaust gas stream of the respective motor vehicle and, for its part, drives the compressor impeller via the common shaft. As the engine rotational speed rises, the shaft rotates increasingly faster. The faster the rotation of the shaft, the more air is conveyed by the compressor which, given the increasing amount of exhaust gas, in turn drives the turbine impeller faster. This also increases the friction within the bearing seats, and the rotational speed of the compressor impeller reaches a rotational speed plateau. Furthermore, the compressor can also reach its delivery limit. The mechanical and thermal limits of the engine can also be exceeded. Consequently, the supercharging of the engine desired in the lower rotational speed range can cause problems in higher rotational speed ranges. To keep the power output within practicable limits and limit the supercharging of the engine, boost pressure control is required.

Such boost pressure control can be accomplished using a wastegate. This is arranged in the exhaust gas stream and is opened from a defined boost pressure by a sensor that is arranged on the compressor side. As a result of said opening of the wastewater, part of the exhaust gas stream is conducted past the turbine impeller into the exhaust pipe of the motor vehicle. This suppresses a further increase in the rotational speed of the turbine impeller.

A wastegate has a flap that, using a lever and a spindle, is connected to an actuator which, by means of said lever and spindle, opens or closes the flap as needed.

FIG. 1 depicts an exhaust gas turbocharger which has a wastegate. This exhaust gas turbocharger 1 has a turbine housing 2, a bearing housing 10 and a compressor housing 11. Arranged within the turbine housing 2 is a turbine impeller 3 which is caused to rotate by the exhaust gas stream of an internal combustion engine. The turbine impeller 3 is connected for conjoint rotation to a shaft 9 which is mounted in the bearing housing 10. Arranged within the compressor housing 11 is a compressor impeller 12 that is also connected for conjoint rotation to the shaft 9 such that the rotation of the turbine impeller 3 is transmitted via the shaft 9 to the compressor impeller 12. The compressor impeller 12 draws fresh air, compresses it, and guides the compressed fresh air to the internal combustion engine. If the boost pressure LD of the compressor exceeds a predetermined pressure value, then the wastegate flap 5 is opened by an actuator 8 that is connected via an actuator rod 7 and a spindle 6 to a wastegate flap 5 such that part of the exhaust gas stream is guided past the turbine impeller 3 through a bypass channel 26 into the exhaust pipe of the respective motor vehicle.

In DE 10 2010 031 500 A1, a device is disclosed for actuating the wastegate flap of the exhaust gas turbocharger of an internal combustion engine. This device has an adjusting rod that can be moved by an actuator in the axial direction and is guided in a first gate via a first bolt on its side facing away from the actuator. Furthermore, a slide is arranged in an articulated manner on the first bolt. On the side facing away from the first bolt, the slide is guided by a second bolt in the first gate. A swiveling lever is arranged in an articulated manner on a second bolt. Furthermore on the side facing away from the second bolt, the swiveling lever is rotatably mounted in the turbine housing of the exhaust gas turbocharger. Furthermore, the wastegate flap is arranged on the swiveling lever on the side facing away from the second bolt. The actuator can be actuated pneumatically, electromechanically or hydraulically.

BRIEF SUMMARY OF THE INVENTION

The object of the invention is to present a variable and compensatable device for actuating the wastegate flap of the exhaust gas turbocharger of an internal combustion engine.

This object is achieved by a device with the features of the main claim. Advantageous embodiments and developments of the invention are specified in the dependent claims.

The advantages of the invention are, in particular, that, by using a resiliently mounted ball head rod, an offset arising in the axial direction between the components of the device can be compensated. In particular, deviations in position between the lever and the actuator rod can be compensated. Furthermore, impacts arising during the operation of the device are dampened by the resilient mounting of the ball head rod.

An additional advantage of the invention is that the precision requirements in assembling the components of the device are reduced since any imprecisions are compensated by the resilient mounting of the ball head rod.

BRIEF DESCRIPTION OF THE SEVERAL VIEWS OF THE DRAWING

Additional advantageous features of the invention can be found in the following exemplary explanation with reference to FIGS. 2-7. In the figures:

FIG. 3 shows a more detailed representation of the ball head rod and its bearing, FIG. 4 shows an enlarged representation of the bearing bolt shown in FIG. 3, FIG. 5 shows an enlarged representation of the extension nut shown in FIG. 3, FIG. 6 shows additional representations to clarify the bearing of the ball head rod.

DESCRIPTION OF THE INVENTION

A device as claimed in the invention for actuating the wastegate flap of the exhaust gas turbocharger of an internal combustion engine contains an actuator having an actuator rod, a lever connected to the actuator rod, a spindle connected to the lever, a wastegate flap which is fastened to the spindle, and a resiliently mounted ball head rod between the actuator rod and the lever.

Figure 1:
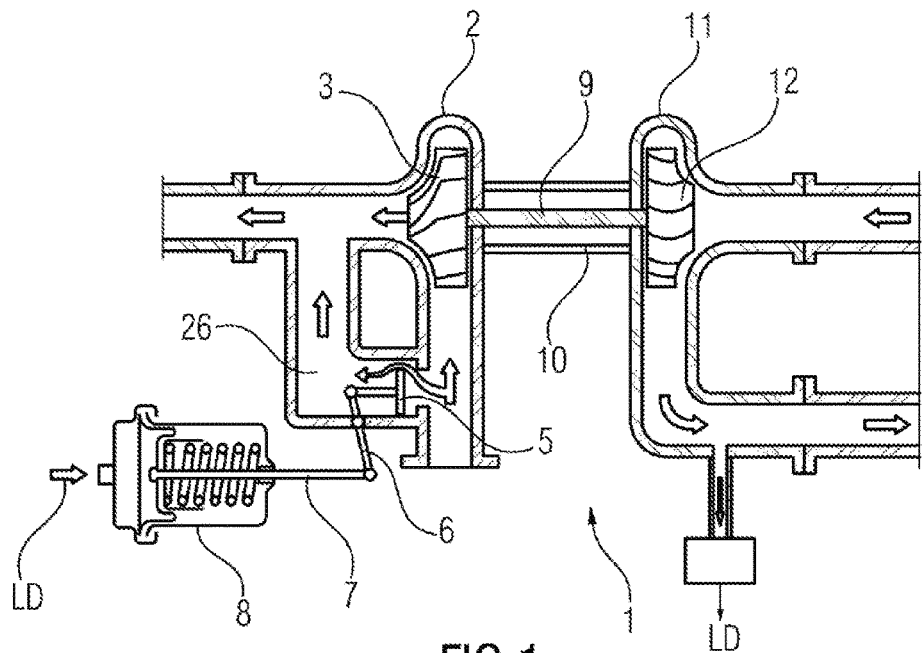
FIG. 1 depicts an exhaust gas turbocharger of the prior art which has a wastegate.
Figure 2:
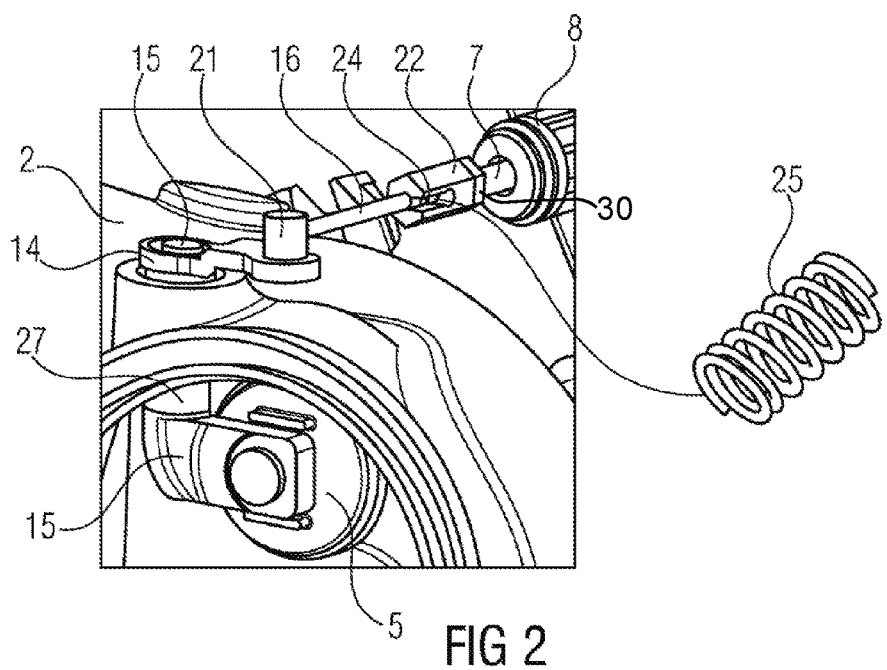
FIG. 2 shows a sketch to illustrate an exemplary embodiment of a device as claimed in the invention.

FIG. 2 shows a sketch to illustrate an exemplary embodiment of such a device as claimed in the invention. In this exemplary embodiment, an actuator 8 is provided that is fastened, for example, to a compressor housing and has an actuator rod 7. This actuator rod is movable in its axial direction in order to open or close a wastegate flap 5 provided in the turbine housing 2 as needed. To this end, the actuator rod 7 is connected to the waste gate flap 5 via a ball head rod 16, a lever 14 and a spindle 15 guided through a sleeve 27.

The end area of the ball head rod 16 facing the actuator rod 7 is resiliently mounted in an extension nut 22 using a spring 25. The extension nut 22 has a slot 24 which, in its end area facing the actuator rod 7, is provided with a round cut-out 28 (see FIG. 5). By means of this slot 24 provided with the round cut out 28, the end area of the ball head rod 16 facing the actuator rod 7 can be inserted in the extension nut 22. The extension nut 22 is securely connected to the actuator rod 7 using a locknut 30.

The end area of the ball head rod 16 facing away from the actuator rod 7 is mounted in a bearing bolt 18 (see FIG. 3) that is connected to the lever 14. The bearing bolt 18 is covered by a cap 21 which is placed from above on the bearing bolt. The lever 14 has a seat in which the top end area of the spindle 15 is inserted. The wastegate flap 5 is fastened to the bottom end area of the spindle 15 which is guided through the sleeve 27.

FIG. 3 shows a more detailed representation of the ball head rod 16 and its bearing. As can be seen from this figure, the end area of the ball head rod 16 mounted in the extension nut 22 has a ball joint 23. This ball joint 23 is mounted in the extension nut 22 by means of a conical seat. The ball joint 23 is pressed into the conical seat of the extension nut 22 and held in this position by the pressure of the spring 25. To give the spring 25 defined contact with the ball joint, the end area of the ball joint 23 facing the actuator rod 7 is equipped with a spring seat 23a. The spring seat can be designed as a simple flattening of the ball joint perpendicular to the longitudinal axis of the ball head rod 16 and, as shown in the above example, can also have a pin 23b arranged in the middle of the flattening which serves to guide the spring 25 as shown enlarged in FIG. 7. The end area of the ball head rod 16 distant from the actuator rod has a ball head 17 which is mounted in a cutout of the bearing bolt 18. The ball head 17 is also mounted in the bearing bolt 18 by means of a conical seat. The bearing bolt is connected to the lever 14. The cap 21 is placed on the bearing bolt 18 from above (with reference to the figure), and the cap overlaps the conical seat of the bearing bolt 18, and hence also the ball head 17 of the ball head rod 16, and thereby secures the ball head 17 in the conical seat of the bearing bolt 18.

FIG. 4 shows an enlarged representation of the bearing bolt 18 shown in FIG. 3. It can be seen that this bearing bolt 18 is provided with a slot 19 through which the end area of the ball head rod 16 facing away from the actuator rod 7 can be inserted into the bearing bolt 18.

FIG. 5 shows an enlarged representation of the extension nut 22 shown in FIG. 3. It can be seen in particular that this extension nut 22 has a slot 24, the end area of which facing the actuator rod 7 is expanded with a round cut out 28. By means of this slot 24 provided with the round cut out 28, the end area of the ball head rod 16 facing the actuator rod 7 that has the ball joint 23 can be inserted in the extension nut 22.

FIG. 6 shows additional representations to clarify the bearing of the ball head rod 16.

From the above discussion of FIG. 6, it follows that an end area of the ball head rod 16 is mounted in the extension nut 22, and the other end area of the ball head rod 16 is connected to the lever 14. If the ball head rod 16 is moved in its axial direction, this causes a rotation of the lever 14 about the middle axis of the spindle 15 which acts via the spindle 15 on the wastegate flap and opens or closes it.

The bottom representation in FIG. 6 shows a section along sectional line B-B of the top representation shown in FIG. 6. It can be seen that the end area of the ball head rod 16 mounted in the extension nut 22 is equipped with a ball joint 23 which is mounted in the extension nut 22 by means of a conical seat, wherein the ball joint 23 is pressed by the spring 25 into the conical seat and held therein. The end area of the ball joint 23 extending toward the actuator rod 7 has a pin 23b around which an end area of the spring 25 is placed. The other end area of the spring 25 abuts the actuator rod 7. Furthermore, it can be seen from FIG. 6 that the end area of the ball head rod 16 distant from the actuator rod 7 is mounted in a bearing bolt 18. This end area of the ball head rod 16 has a ball head 17 which is mounted in a cut out of the bearing bolt.

Figure 7:
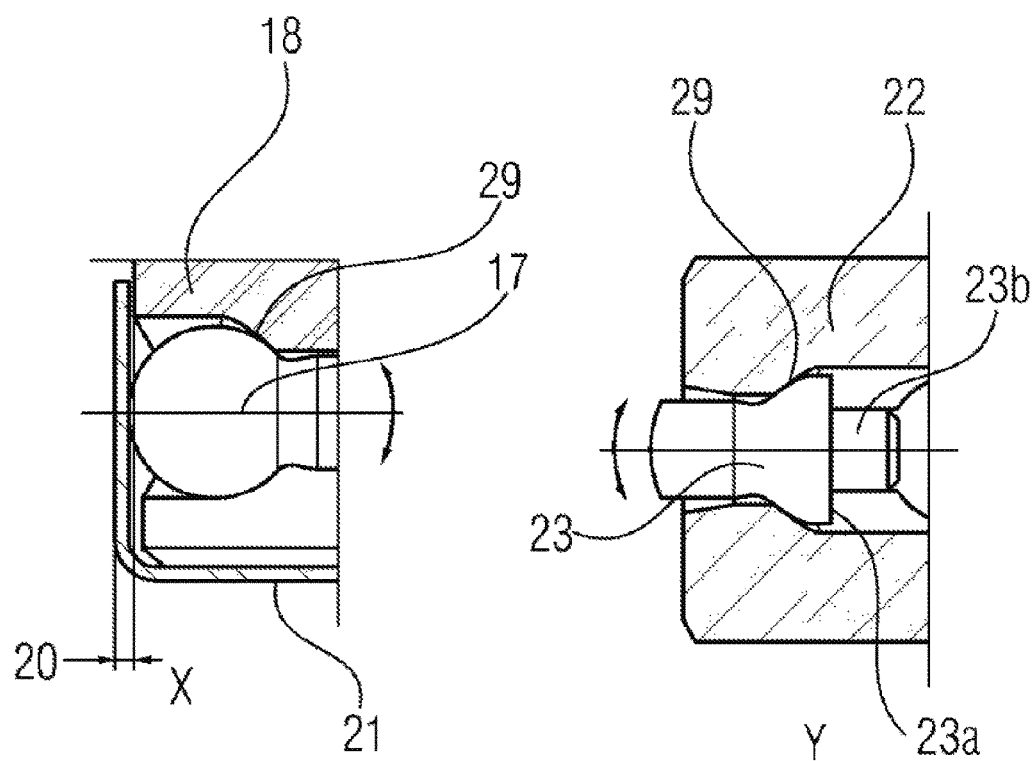
FIG. 7 shows enlarged representations of details from FIG. 6.

FIG. 7 shows enlarged representations of the detail areas X and Y shown in FIG. 6.

From the representation on the left in FIG. 7, it can be seen that the end area of the ball head rod 16 having a ball head 17 is mounted in the bearing bolt 18 by means of a conical seat 29. The end area of the ball head 17 distant from the actuator rod 7 has a projection 20 beyond the outer area of the bearing bolt 18 distant from the actuator rod 7. This projection 20 is designed to ensure that the cap 21 can still be placed on the bearing bolt 18 when assembling the device. The cap 21 is produced from a material that, to a certain extent, is elastic such as spring steel and, after being put on, exerts a spring force on the projecting ball head 17 which presses said ball head into the conical seat 29 of the bearing bolt 18 and holds it therein. Furthermore, the cap 21 is designed such that when the device is operating, a desired pressure can be transmitted in the pressing direction from the ball head rod 16 via the flap 21 and the bearing bolt 18 to the lever 14 in order to actuate the wastegate flap 5 in the opening direction.

From the representation on the right in FIG. 7, it can be seen that the end area of the ball head rod 16 having a ball joint 23 is mounted in the extension nut 22 by means of a conical seat 29.

As can be seen from the preceding explanations, a ball head rod is provided in a device as claimed in the invention between the actuator having an actuator rod, and the lever acting via a spindle on the wastegate flap. This end area facing the lever is provided with a ball head which is mounted by means of a conical seat in a bearing bolt connected to the lever. The end area of the ball head rod facing the actuator rod has a spring-loaded ball joint which is also mounted by means of a conical seat in an extension nut securely connected to the actuator rod. By means of such a bearing, an axial offset of the ball head rod actuating the wastegate flap, which is caused by the rotation of the lever 14 about the longitudinal axis of the spindle 15, can be compensated. A variable and compensatable connection of these components is thereby achieved. An adjustment that is made can be secured by means of a locknut.

Easy installation of the ball head rod is enabled by the above-described slots in the bearing bolt, in the extension nut and in the cap 21, wherein the ball joint of the ball head rod is insert able through the round cut-out of the slot into the extension nut.

In conjunction with the described conical seat at both ends of the ball head rod, the resilient bearing of the ball head rod in the conical seat 29 enables a pivoting movement of the ball head rod in the respective conical seat to a specific, although slight degree as indicated in FIG. 7, and hence a compensation of positional variations between the contact point of the ball head rod on the lever and the extension of the longitudinal axis of the actuator rod.

The device can be provided with a desired initial tension by means of the spring. In particular, this initial tension can be adjusted so that, in the state of initial tension, a desired pressure can be transmitted to the lever in order to keep the wastegate flap in the closed state. Furthermore, impacts are dampened by the spring during operation of the device.

The connection of the components of the device is variably adjustable without play.

The invention claimed is:

1. A device for actuating a waste gate flap of an exhaust gas turbocharger of an internal combustion engine, the device comprising:
   an actuator having an actuator rod;
   a lever connected to said actuator rod;
   a spindle connected to said lever and the waste gate flap being fastened to said spindle;
   a spring-mounted ball head rod disposed between said actuator rod and said lever; and
   an extension nut, said spring-mounted ball head rod having an end area facing said actuator rod and connected via said extension nut to said actuator rod;
   said extension nut having a side surface, an end surface, and a slot formed in said side surface and said end surface, said slot extending from said side surface into said end surface; and
   said end area of said spring-mounted ball head rod facing said actuator rod being inserted through said slot into said extension nut.

2. The device according to claim 1, further comprising a bearing bolt connected to said lever, said spring-mounted ball head rod having an end area distant from said actuator rod and said end area having a ball head which is mounted in said bearing bolt.

3. The device according to claim 2, wherein said bearing bolt has a conical seat and said ball head is mounted in said conical seat of said bearing bolt.

4. The device according to claim 2, wherein said bearing bolt has a slot formed therein and through said slot said end area of said spring-mounted ball head rod distant from actuator rod can be inserted into said bearing bolt.

5. The device according to claim 2, wherein said end area of said ball head distant from said actuator rod has a projection beyond an end area of said bearing bolt distant from said actuator rod.

6. The device according to claim 5, further comprising a cap covering said bearing bolt.

7. The device according to claim 6, wherein said projection is configured such that a pressure can be exerted by means of said ball head via said cap in a direction running away from said actuator rod.

8. The device according to claim 1, further comprising a lock nut, said extension nut being securely connected to said actuator rod via said lock nut.

9. The device according to claim 1, wherein said end area of said spring-mounted ball head rod facing said actuator rod is mounted in said extension nut.

10. The device according to claim 9, wherein said end area of said spring-mounted ball head rod facing said actuator rod has a ball joint which is mounted in said extension nut.

11. The device according to claim 10, wherein said extension nut has a conical seat, said ball joint is mounted by means of said conical seat in said extension nut.

12. The device according to claim 9, wherein said end area of said spring-mounted ball head rod facing said actuator rod is resiliently mounted in said extension nut.

* * * * *